(12) United States Patent
Gehrmann et al.

(10) Patent No.: US 11,222,167 B2
(45) Date of Patent: Jan. 11, 2022

(54) GENERATING STRUCTURED TEXT SUMMARIES OF DIGITAL DOCUMENTS USING INTERACTIVE COLLABORATION

(71) Applicant: Adobe Inc., San Jose, CA (US)

(72) Inventors: Sebastian Gehrmann, Cambridge, MA (US); Franck Dernoncourt, Sunnyvale, CA (US); Lidan Wang, San Jose, CA (US); Carl Dockhorn, San Jose, CA (US); Yu Gong, San Jose, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/721,084

(22) Filed: Dec. 19, 2019

(65) Prior Publication Data

US 2021/0192126 A1  Jun. 24, 2021

(51) Int. Cl.
| | |
|---|---|
| *G06F 17/00* | (2019.01) |
| *G06F 40/169* | (2020.01) |
| *G06N 20/00* | (2019.01) |
| *G06F 40/284* | (2020.01) |
| *G06F 3/0482* | (2013.01) |
| *G06F 40/253* | (2020.01) |
| *G06F 40/117* | (2020.01) |

(52) U.S. Cl.
CPC .......... *G06F 40/169* (2020.01); *G06F 3/0482* (2013.01); *G06F 40/117* (2020.01); *G06F 40/253* (2020.01); *G06F 40/284* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 5,708,825 A * | 1/1998 | Sotomayor | G06F 40/134 715/205 |
| 10,681,095 B1 * | 6/2020 | Wang | H04L 63/105 |
| 2007/0118518 A1 * | 5/2007 | Wu | G06F 16/345 |
| 2008/0071762 A1 * | 3/2008 | Turner | G06F 16/313 |
| 2013/0332412 A1 * | 12/2013 | Amarendran | G06F 16/113 707/610 |
| 2015/0363407 A1 * | 12/2015 | Huynh | H04L 67/02 707/738 |
| 2017/0124039 A1 * | 5/2017 | Hailpern | G06F 3/04842 |
| 2018/0075139 A1 * | 3/2018 | Sadovsky | G06F 16/345 |
| 2018/0157628 A1 * | 6/2018 | Hollingsworth | G06F 3/0482 |
| 2018/0239741 A1 * | 8/2018 | Agarwal | G06F 16/334 |
| 2020/0004395 A1 * | 1/2020 | Chakerian | G06F 16/289 |

* cited by examiner

*Primary Examiner* — Mustafa A Amin
(74) *Attorney, Agent, or Firm* — Keller Jolley Preece

(57) ABSTRACT

The disclosure describes one or more embodiments of a structured text summary system that generates structured text summaries of digital documents based on an interactive graphical user interface. For example, the structured text summary system can collaborate with users to create structured text summaries of a digital document based on automatically generating document tags corresponding to the digital document, determining segments of the digital document that correspond to a selected document tag, and generating structured text summaries for those document segments.

20 Claims, 11 Drawing Sheets

Topics:

- Lively motor city ✕
- Poorest big city ✕
- New small business ✕
- Largest city bankruptcy ✕
- + Add new tag...

Document:

The city of Detroit, in the USA, was once compared to Paris. It had a broad river, smart streets and historically important architecture. Then, in the 20th century, it became 'Motor City'. For a time, most of the world's cars were made here. There was regular work and a good salary in the motor industry. A worker at one of the car factories could own a home, plus a boat, maybe even a holiday cottage. Some say America's middle class was born in Detroit – new highways certainly made it easy for workers to move from the city center to the suburbs in the 1950s. But in the early years of the 21st century, Detroit became America's poorest big city.

In less than five decades the once lively Motor City lost more than half its population. It became known as a city that was failing, full of ruined buildings, extensive poverty and crime. Newspapers and magazines told stories of derelict homes and empty streets. Photographers went to Detroit to record the strange beauty of buildings and city blocks where nature was taking over again. What went wrong in Detroit?

The city is now 69th among US cities for the number of people per square mile. The population fell for several reasons. Partly, it was because people moved to the suburbs in the 1950s. Then there were the shocking riots in 1967, which scared more people away from the city. Then there was the dramatic fall in car manufacture as companies like General Motors and Chrysler faced huge

Summaries:

- Suggest Summary

*Fig. 3*

Topics:

- Lively motor city ✕
- Poorest big city ✕
- New small business ✕
- Largest city bankruptcy ✕
- + Add new tag...

Summaries:

- Suggest Summary
- Detroit once compared to Paris ✕
- It had a river, smart streets, and important architecture ✕
- Most of the world's cars were made here ✕
- Regular work and good salary ✕
- But Detroit became America's poorest big city. ⊕

Document:

+Add ─Remove ↻Reset

The city of Detroit in the USA, was once compared to Paris. It had a broad river, smart streets and historically important architecture. Then, in the 20th century, it became "Motor City". For a time, most of the world's cars were made here. There was regular work and a good salary in the motor industry. A worker at one of the car factories could own a home, plus a boat, maybe even a holiday cottage. Some say America's middle class was born in Detroit — new highways certainly made it easy for workers to move from the city center to the suburbs in the 1950s. But in the early years of the 21st century Detroit became America's poorest big city.

In less than five decades the once lively Motor City lost more than half its population. It became known as a city that was failing, full of ruined buildings, extensive poverty and crime. Newspapers and magazines told stories of derelict homes and empty streets. Photographers went to Detroit to record the strange beauty of buildings and city blocks where nature was taking over again. What went wrong in Detroit?

The city is now 69th among US cities for the number of people per square mile. The population fell for several reasons. Partly, it was because people moved to the suburbs in the 1950s. Then there were the shocking riots in 1967, which scared more people away from the city. Then there was the dramatic fall in car manufacture as companies like General Motors and Chrysler faced huge

*Fig. 7*

GENERATING STRUCTURED TEXT SUMMARIES OF DIGITAL DOCUMENTS USING INTERACTIVE COLLABORATION

BACKGROUND

Recent years have witnessed a significant increase in the field of digital text synthesis. Indeed, advances in both hardware and software have increased the availability of creating, analyzing, and synthesizing digital content within digital documents. Additionally, the increased availability and portability of computing devices is resulting in individuals and entities creating and sharing more digital documents. Further, computing systems are automatically (e.g., without human input) creating and curating an increasing number of digital documents. Along with the increase in digital documents comes the need to be able to optimally summarize, structure, comprehend, and share key pieces of information from these documents, especially digital documents that are longer and more complex.

While various conventional text synthesis systems can extract information from digital documents, many technological issues remain with regard to these conventional systems, particularly in the area of accuracy, efficiency, and flexibility of operation. To illustrate, as an example of inaccuracy, many conventional systems use imprecise approaches to extract information from digital documents. For example, some conventional systems utilize a one-size-fits-all approach to extract information from digital documents. However, because the scope and depth of information vary widely across digital documents, these conventional systems perform poorly when trying to extract information, which leads to inaccurate and unhelpful results. In contrast, a few conventional systems can achieve high-levels of accuracy; however, these conventional systems can achieve such results only for a very specific and limited domain on digital documents (e.g., extracting medical terms from a medical text).

In addition, many conventional systems do not factor in the objectives or goals of individuals when extracting information from digital documents. As a result, these conventional systems often extract imprecise and irrelevant summaries from digital documents. To illustrate, two individuals may have different objectives when accessing the same digital document, which results in these two individuals focusing on different sections, depths, scopes, or themes of the digital document. Despite these differences, many conventional systems will generically extract the same information from the digital document, which is often inaccurate and unhelpful to one or both of the individuals.

Moreover, conventional systems have significant shortfalls in relation to flexibility of operation. As mentioned above, many conventional systems are too generic to produce useful text summaries of digital documents. Other conventional systems are too specialized to function across a wide scope of digital documents. Further, many conventional systems do not allow for text summaries of limited portions of a digital document, such as a few paragraphs or less. Accordingly, the rigid constraints of conventional systems generally limit their usability for a large number of individuals.

Accordingly, these, along with additional problems and issues exist in conventional systems with respect to creating text summaries of digital documents.

BRIEF SUMMARY

Embodiments of the present disclosure provide benefits and/or solve one or more of the foregoing or other problems in the art with systems, non-transitory computer-readable media, and methods that provide a technical improvement over conventional system by providing for intelligently structured text summaries of digital documents. For instance, the disclosed systems utilize a multi-stage approach to generate accurate and structured text summaries from digital documents. For example, the disclosed systems can automatically generate relevant document tags that correspond to content within a digital document, which can be supplemented with user-created document tags. Additionally, for each document tag, the disclosed systems can identify corresponding segments of content within the digital document as well as modify these identified segments based on user input. Further, the disclosed systems can generate structured text summaries tailored to the identified document segments (and their corresponding document tags). Moreover, the disclosed systems can provide an interactive graphical user interface that receives user input to generate accurate results at each stage as well as satisfy the objectives of the user with respect to the digital document.

The following description sets forth additional features and advantages of one or more embodiments of the disclosed systems, computer media, and methods.

BRIEF DESCRIPTION OF THE DRAWINGS

The detailed description provides one or more embodiments with additional specificity and detail through the use of the accompanying drawings, as briefly described below.

FIG. 3 illustrates an interactive graphical user interface that includes document tags generated for a digital document in accordance with one or more embodiments.

FIG. 7 illustrates an interactive graphical user interface that includes a generated structured text summary based on a document segment and a selected document tag in accordance with one or more embodiments.

DETAILED DESCRIPTION

Figure 1:
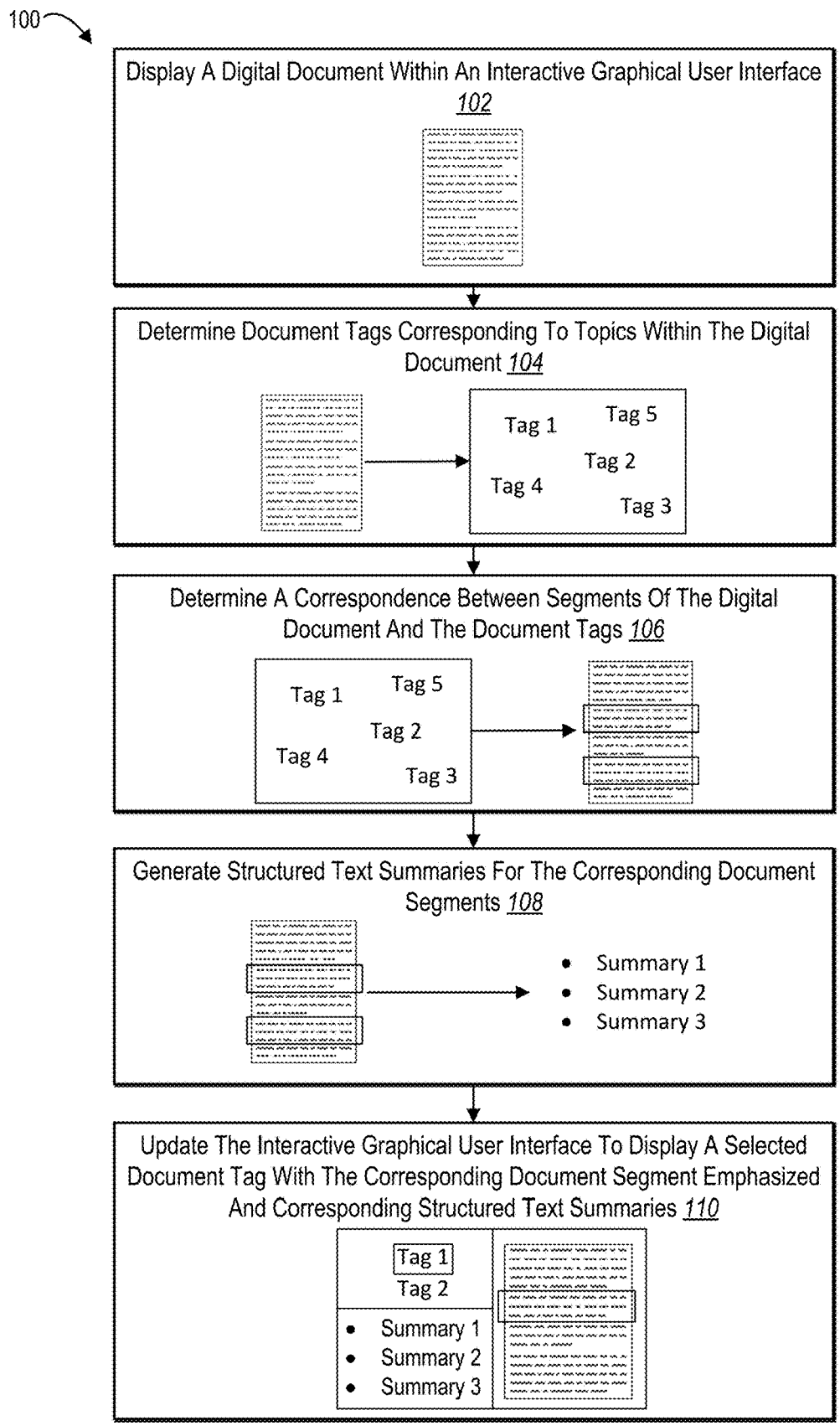
FIG. 1 illustrates an overview diagram of providing structured text summaries of a digital document within an interactive graphical user interface in accordance with one or more embodiments.

This disclosure describes one or more embodiments of a structured text summary system that intelligently generates structured text summaries of digital documents in connection with an interactive graphical user interface. For example, the structured text summary system can automatically generate document tags corresponding to the digital document, determine segments of the digital document that correspond to a selected document tag, and generate structured text summaries for the determine document segments. In addition, the structured text summary system can provide an interactive graphical user interface that facilitates user collaboration with the structured text summary system to improve and customize each of the document tags, document segments, and structured text summaries. Accordingly, the structured text summary system can efficiently improve the accuracy and usability of structured text summaries via the use of the interactive graphical user interface.

To illustrate, in one or more embodiments, the structured text summary system (or simply "text summary system") can determine one or more distinctive document tags for a digital document. In addition, the text summary system can display the document tags within the interactive graphical user interface along with content of the digital document. The text summary system can determine a segment of the digital document that corresponds to each of the document tags. For example, the text summary system can highlight segments of text that are found to correspond to a selected document tag. Also, the text summary system can generate structured text summaries of the document segments. Moreover, the text summary system can also display a selected document tag, corresponding document segments, and corresponding structured text summaries within the interactive graphical user interface. Further, as described below, the text summary system can receive and use interactive feedback from the user at each of the stages mentioned above to tailor and customize the document tags, document segments, and/or structured text summaries.

As mentioned above, the text summary system can provide an interactive graphical user interface that collaboratively functions in connection with user input to create improved structured text summaries. For example, the interactive graphical user interface displays content from a digital document. In addition, the interactive graphical user interface includes a document tag portion that displays one or more document tags. In some embodiments, the document tag portion can include interactive elements that facilitate adding, editing, removing, or otherwise modifying document tags.

In one or more embodiments, the interactive interface includes a document content portion that displays segments of the digital document that correspond to selected document tags. In addition, the document content portion can include interactive elements that facilitate adding or removing document content of the digital document from a document segment with respect to a selected document tag. Further, the interactive graphical user interface can include a structured text summary portion that displays structured text summaries generated by the text summary system. The structured text summary portion can also include interactive elements that facilitate adding, editing, removing, or otherwise modifying structured text summaries.

As previously mentioned, the text summary system can automatically generate one or more document tags that correspond to the digital document. To briefly illustrate, in one or more embodiments, the text summary system identifies candidate document tags in a digital document based on one or more grammar matching patterns. Next, the text summary system can utilize ranking models to order the candidate document tags and filter out overlapping non-distinct candidate document tags. Further, the text summary system can select a top number of candidate document tags to display within the document tag portion of the interactive graphical user interface. Moreover, as mentioned above, the text summary system can receive and utilize interactive feedback from a user to add to, edit, or remove document tags generated by the text summary system.

For one or more document tags, the text summary system can identify corresponding content in the digital document. More specifically, the text summary system can determine segments of the digital document (e.g., sentences or paragraphs) that have a correspondence to a document tag. To illustrate, in one or more embodiments, the text summary system can pre-process the text within a digital document as well as split the content of the digital document into segments. In some embodiments, the text summary system can vectorize the segments as well as each of the document tags and compare the vectored results to determine similarities/correspondence between each document tag and each segment. For example, if the similarity between a vectorized document segment and vectorized document tag satisfies one or more similarity thresholds, than the text summary system links the document segment with the corresponding document tag.

In addition, the text summary system can emphasize a document segment within the interactive graphical user interface in connection with a corresponding document tag. For example, in various embodiments, when a user selects a document tag within the document tag portion, the text summary system can highlight (i.e., emphasize) the document segment within the document content of the interactive graphical user interface. In additional embodiments, as mentioned above, the text summary system can facilitate adding or removing content from a document segment with respect to a selected document tag. For example, the text summary system can, based on user input, deselect one or more sentences from a selected paragraph to remove the correspondence between those sentences and the selected document tag.

As also mentioned above, the text summary system can generate structured text summaries based on the determined document segments. In one or more embodiments, the text summary system utilizes a machine-learning model to generate initial structured initial text summaries of a document segment. For example, the text summary system utilizes a sequence-to-sequence transformer model to output a string of initial text summaries for a document tag segment. In additional embodiments, the text summary system can also generate a list of structured text summaries from the initial text summaries, as described below.

Additionally, the text summary system can display the structured text summaries in the structured text summary portion of the interactive graphical user interface. As mentioned above, the text summary system can facilitate editing, removing, or otherwise modifying the structured text summaries within the interactive graphical user interface. For example, the text summary system can allow users to combine, separate, add, delete, edit or modify one or more structured text summaries with respect to a selected document tag and/or a corresponding document segment.

In various embodiments, the text summary system utilizes machine-learning models to generate document tags, determine corresponding document segments, and/or generate text summaries. Further, as mentioned above, the text summary system uses facilitates and utilizes interactive user feedback to refine results at each stage of the process such that the results at the next stage are more accurate and tailored to the user. In addition, the text summary system can use the collaboration and feedback from the user to improve results in the future. Indeed, the text summary system can further train one or more machine-learning models based on user feedback to provide better future results to the user at each stage of generating structured text summaries.

In addition, the text summary system can facilitate sharing the digital document and/or structured text summaries with other users. For example, the text summary system can provide a similar interactive graphical user interface to a second user, which preserves the structure created by the text summary system in collaboration with the first user. In another example, the text summary system can extract the document tags along with their corresponding document segments, and corresponding structured text summaries in a manner that maintains the structure of the text summaries with respect to the digital document. By sharing structured text summaries of the digital document in a structured manner, users can quickly come to a mutual understanding of the digital document.

As previously mentioned, the text summary system can provide numerous advantages and benefits over conventional systems via a practical application (e.g., interactive user interface and supporting backend systems). In particular, the text summary system can efficiently generate accurate and tailored structured text summaries via an interactive graphical user interface. Indeed, the text summary system can improve computing devices with regard to accuracy, efficiency, and flexibility of operation.

Regarding accuracy, the text summary system can collaborate with users at each stage to generate highly-accurate structured text summaries. For instance, the text summary system can utilize models based on user input to more accurately determine segments within a digital document corresponding to a document tag as well as generate higher-quality structured text summaries corresponding to the document segments. Indeed, based on collaboration and interactive feedback, the text summary system can utilize models to create structured text summaries that are non-generic, relevant, and useful to the user.

Indeed, by providing the interactive graphical user interface that facilitates interactive user feedback, the text summary system can generate structured text summaries that are tailored to the goals and objectives of a user. More particularly, the text summary system can accurately generate structured text summaries that extract information from a digital document that is relevant to the user. Further, the text summary system can generate structured text summaries for portions of the digital document that are important to the user while ignoring less important portions of the digital document.

In addition, the text summary system can improve efficiency relative to conventional systems. For example, by utilizing an interactive graphical user interface that facilitates collaboration at each stage of generating structured text summaries from a digital document, the text summary system can significantly reduce the time and user interactions needed to improve generating structured text summaries. Indeed, rather than inefficiently creating inaccurate structured text summaries that are irrelevant to the user, the text summary system can create relevant and accurate structured text summaries based on document tags and/or corresponding document segments provided by the user via the interactive graphical user interface.

Additionally, the text summary system can provide improved flexibility over conventional systems. For instance, the text summary system can provide an intuitive and easy-to-use interactive graphical user interface applicable to various skill and experience levels. In addition, the text summary system can utilize multiple models that achieve improved results based on user collaboration and feedback. Further, the text summary system can flexibly operate across a wide scope of digital content. Moreover, the text summary system can generate structured text summaries from limited portions of a digital document (e.g., for a limited number of document tags corresponding to the digital document) rather than for an entire digital document.

Further, the text summary system can provide tools that reduce or eliminate various navigational steps. For example, by providing an interactive graphical user interface that combines various stages of the structured text summary process into a single user interface (rather than multiple interfaces and/or multiple applications). The text summary system eliminates navigational steps (i.e., reduces the number of steps) needed to structured text summaries from a digital document (e.g., based on document tags and/or corresponding document segments within the digital document). Indeed, upon adding and/or selecting a document tag, the text summary system can determine and emphasize (e.g., highlight) a document segment within the digital document that includes corresponding content to the document tag. In addition, the text summary system can also automatically generate and display structured text summaries with respect to the selected document tag and/or the corresponding document segment.

As illustrated by the foregoing discussion, the present disclosure utilizes a variety of terms to describe features and advantages of the structured text summary system (e.g., text summary system). To illustrate, as used herein, the term "digital document" refers to an electronic or digital file. For instance, a digital document includes a digital file capable of storing one or more strings of electronic text. For example, a digital document can include electronic files in the form of a text file, a word-processing file, a portable document file (PDF), an e-mail file, a web page, etc. Digital documents can include digital text or images of digital text. In addition, the content in a digital document can be grouped by words, phrases, sentences, paragraphs, pages, slides, sheets, layers, sections, divisions, chapters, books, or volumes.

The term "interactive graphical user interface," (or simply "interactive interface") as used herein, refers to a graphical user interface that can receive and change based on user input. For instance, an interactive graphical user interface can include visual elements that update based on user input with one or more interactive (e.g., selectable) elements within the interactive graphical user interface. In one or more embodiments, the interactive graphical user interface (e.g., an interactive structured text summary user interface) can include various portions, such as a document content portion that can display document content from a digital document, a document tag portion that can display one or more document tags corresponding to the digital document, and a structured text summary portion that can display one or more structured text summaries corresponding to the digital document.

In additional embodiments, the document content portion can emphasize (e.g., highlight) one or more document segments (e.g., words, phrases, sentences, paragraphs, pages, slides, sheets, layers, or sections) within the interactive graphical user interface. Further, as detailed below, the interactive graphical user interface can include tools or elements for a user to collaborate with the text summary system, such as tools to add, remove, edit, or modify document tags, document segments, and/or structured text summaries.

As used herein, the term "structured text summaries" refers to a string of text that corresponds to a document tag and/or one or more document segments within a digital document. For instance, a structured text summary is based on the text found within one or more document segments of the digital document. When a document segment is determined based on its correspondence to a document tag, the structured text summaries generated for the document segment likewise corresponds to the document tag. Accordingly, in many embodiments, structured text summaries can correspond to both a particular document tag and one or more document segments that correspond to the document tag. Thus, structured text summaries can refer to one or more text summaries that provide a correlated structure between document tags and digital content within the digital document.

As used herein, the term "model" refers to a computer-implemented algorithmic method utilized by the structured text summary system at one of the stages of generating structured text summaries. For example, the structured text summary system can utilize one or more models to generate structured text summaries, including, but not limited to grammar pattern matching models, parts-of-speech models, ranking models, word pre-processing models, term frequency models, inverse document frequency models, ranking models, filtering models, cosine comparison models, word tokenizer models, sentence tokenizer models, word stemming models, word vectorization models (e.g., text vectorization models), similarity threshold models, and/or machine-learning models (e.g., structured text summaries machine-learning models).

In addition, the term "machine-learning model" refers to a computer representation that can be tuned (e.g., trained) based on inputs to approximate unknown functions. In particular, a machine-learning model can include a model that utilizes algorithms to learn from, and make predictions on, known data by analyzing the known data to learn to generate outputs that reflect patterns and attributes of the known data. For instance, machine-learning models can include but are not limited to, vectorization machine-learning models, structured text summaries machine-learning models (e.g., sequence-to-sequence models and/or transformer models). In addition, the term machine-learning model can include linear regression models, logistical regression, random forest models, support vector machines (SVG) models, neural networks, or decision tree models. Thus, a machine-learning model can make high-level abstractions in data by generating data-driven predictions or decisions from the known input data.

As used herein, the term "neural network" refers to a machine learning model that can be tuned (e.g., trained) based on inputs to approximate unknown functions. In particular, the term neural network can include a model (e.g., a deep learning model) of interconnected neurons that communicate and learn to approximate complex functions and generate outputs based on a plurality of inputs provided to the model. For instance, the term neural network includes an algorithm (or set of algorithms) that implements deep learning techniques that utilize a set of algorithms to model high-level abstractions in data using supervisory data to tune parameters of the neural network. Examples of neural networks include a recurrent neural network (RNN), graph neural network, generative adversarial neural network (GAN), convolutional neural network (CNN), Region-CNN (R-CNN), Faster R-CNN, Mask R-CNN, and single-shot detect (SSD) networks.

Referring now to the figures, FIG. 1 illustrates an overview diagram of providing structured text summaries of a digital document within an interactive graphical user interface in accordance with one or more embodiments. As shown, FIG. 1 includes a series of acts 100 for generating structured text summaries via the interactive graphical user interface. As shown, the series of acts 100 includes an act 102 of the text summary system displaying a digital document within an interactive graphical user interface. For example, the text summary system (i.e., structured text summary system) generates the interactive graphical user interface (or simply "interactive interface") and causes a client device associated with a user to display the interactive interface in connection with assisting the user to curate structured text summaries. Examples of the interactive interface are provided below in connection with FIGS. 3, 5, and 7.

As shown, the series of acts 100 can include an act 104 of the text summary system determining document tags corresponding to topics within the digital document. In one or more embodiments, the text summary system automatically generates a list of document tags, determines which document tags in the list are most relevant, and displays the most relevant document tags within the interactive interface. In some embodiments, the text summary system collaborates with the user via the interactive interface to include document tags provided via user input. In this manner, the user can re-target the text summary system to focus on topics in the digital document that are of most interest to the user, as discussed below. Examples of providing document tags within the interactive interface with respect to a digital document are provided below in connection with FIGS. 2 and 3.

The series of acts 100 also includes an act 106 of the text summary system determining a correspondence between segments of the digital document and the document tags. For instance, the text summary system compares the document tags (e.g., auto-generated document tags as well as user-provided document tags) to digital content within the digital document. More specifically, the text summary system can divide the digital document into coherent segments (e.g., sentences, paragraphs, slides, layers, or sections) and compare each document segment to each of the document tags to determine which document segments relate to which document tags.

Additionally, when the text summary system detects a user selecting a document tag via the interactive interface, the text summary system can emphasize (e.g., highlight, underline, or bold) the corresponding document segment within the digital document. Further, as described below, the text summary system can collaborate with the user to associate more or less content of the digital document with a document tag via the interactive interface. Examples of determining correspondences between document tags and document segments are provided below in connection with FIGS. 4 and 5.

FIG. 1 also shows that the series of acts 100 includes an act 108 of the text summary system generating structured text summaries for corresponding document segments. In one or more embodiments, the text summary system automatically generates structured text summaries for each of the document segments that correspond to a document tag. In alternative embodiments, the text summary system can generate (or regenerate) a text summary system for a document segment in response to a user request. In addition, the text summary system can collaborate with the user to add, edit, remove, or modify structured text summaries, as further described below. Examples of generating structured text summaries from document segments are provided below in connection with FIGS. 6 and 7.

As shown, the series of acts 100 includes an act 110 of the text summary system updating the interactive graphical user interface to display a selected document tag with the corresponding document segment emphasized and corresponding structured text summaries. For example, in various embodiments, the text summary system utilizes the interactive interface to provide a correlated structure between document tags, digital content within the digital document (e.g., corresponding document segments), and structured text summaries. Indeed, the text summary system assists users to organize digital content within the digital document by topic (i.e., document tags) as well as provide structured text summaries of the digital content in a structured and meaningful manner.

In example embodiments, the text summary system provides tools via the interactive interface to share the structured text summaries with other users. In one or more embodiments, the text summary system can directly share or provide access to the interactive interface of the digital document (along with the document tags, corresponding document segments, and/or structured text summaries) to another user. In various embodiments, the text summary system creates and shares a summary of the digital document that includes document tags, corresponding document segments, and/or corresponding structured text summaries.

In some embodiments, the text summary system shares the structured text summaries by exporting the digital document. For example, the text summary system highlights each of the determined document segments in the digital document. In addition, the text summary system can provide comments that indicate the document tag associated with each document segment as well as the structured text summaries generated for each document segment.

In various embodiments, the text summary system shares the digital document along with the structured text summaries or shares only the structured text summaries with another user. In one or more embodiments, the text summary system shares the document tags and corresponding structured text summaries without sharing the document content of the digital document (or initially hides the document content upon sharing).

Figure 2:
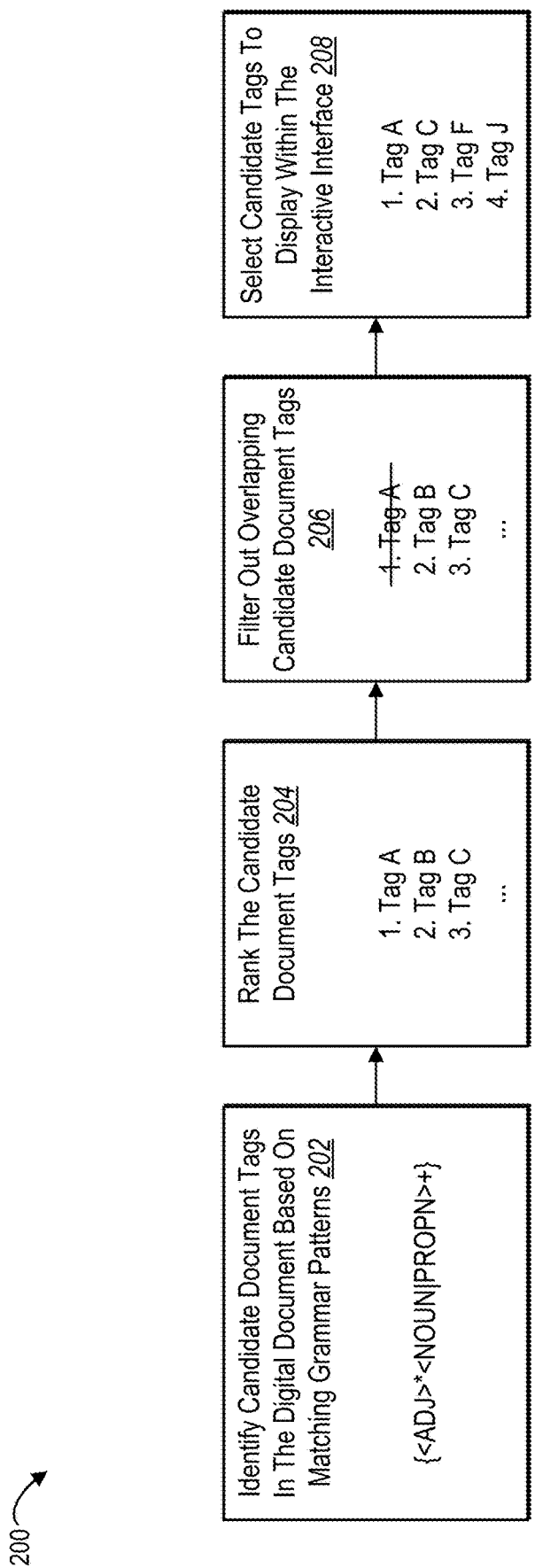
FIG. 2 illustrates a flow diagram of generating relevant document tags for a digital document in accordance with one or more embodiments.

As mentioned above, FIGS. 2 and 3 illustrates the text summary system (i.e., structured text summary system) determining document tags (e.g., topics) for a digital document. To illustrate, FIG. 2 shows a flow diagram of a series of acts 200 for generating relevant document tags for a digital document in accordance with one or more embodiments. For example, the text summary system can automatically generate document tags upon receiving a digital document. In alternative embodiments, the text summary system generates one or more document tags in response to a user requesting via the interactive interface that the text summary system generates document tags for the digital document. Further, in some embodiments, such as longer digital documents, the text summary system may prompt the user whether to generate document tags for the entire, or for only selected portions of, the digital document.

As shown in FIG. 2, the series of acts 200 includes an act 202 of the text summary system identifying candidate document tags in the digital document based on matching grammar patterns. For instance, in one or more embodiments, the text summary system utilizes a grammar pattern matching model to identify candidate document tags within the digital document. As part of utilizing the grammar pattern matching model, the text summary system can assign each word in the digital document to a part of speech based on the word's syntactic role in a sentence. For example, the text summary system utilizes a parts-of-speech model to categorize a word as a noun, pronoun, verb, adverb, adjective, conjunction, preposition, or interjection. In some embodiments, the text summary system can classify a word as having multiple parts of speech.

Upon assigning parts of speech to each word, as mentioned above, the text summary system can identify grammar patterns within the digital document. For example, the text summary system can identify one or more adjectives followed by one or more nouns or proper nouns within the digital document. In some embodiments, the text summary system identifies up to a threshold number of words (e.g., up to three, five, or seven words). By identifying phrases that include adjectives and nouns as candidate document tags, the text summary system can rule out a large amount of less relevant words in the digital document that are assigned to other parts of speech.

In some embodiments, the text summary system broadens the grammar matching pattern to zero or more adjectives followed by one or more nouns or proper nouns. To illustrate, the act 202, shows the above-mentioned grammar matching pattern "{<ADJ>*<NOUN|PROPN>+}" as an example, where "*" represents zero adjectives or more and "+" represents one or more nouns or proper nouns. While example grammar matching patterns are shown, the text summary system can identify other grammar matching patterns (e.g., include prepositions or articles in the grammar pattern).

The text summary system can identify each word or phrase that matches the grammar pattern as a candidate document tag. Depending on the length of the digital document, the text summary system can identify a large number of candidate document tags. For example, using the grammar matching pattern shown above, the text summary system can identify one or more candidate document tags for each sentence included in the digital document.

To reduce the number of candidate document tags, the text summary system can remove less relevant candidate document tags. As shown, the series of acts 200 includes an act 204 of the text summary system ranking the candidate document tags. For example, the text summary system can rank the candidate document tags and select a number (e.g., 10, 20, 50, or 100) of the top-ranked candidate document tags while discarding or ignoring the lower-ranked candidate document tags.

For example, the text summary system utilizes a ranking model to order the candidate document tags. In some embodiments, the text summary system can utilize a topical PageRank model to rank the candidate document tags. In one or more embodiments, the text summary system ranks candidate document tags based on popularity. In other embodiments, the text summary system ranks the candidate document tags based on relevance to the digital document (e.g., term frequency and/or inverse document frequency). In various embodiments, the text summary system utilizes a history of document tags previously provided by the user (or other users) to rank the candidate document tags (e.g., document tags located on a list of previously provided document tags are ranked above other document tags).

In addition, the text summary system can further reduce the number of candidate document tags. To illustrate, the series of acts 200 includes an act 206 of the text summary system filtering out overlapping candidate document tags. For example, for each candidate document tag, the text summary system determines if a higher ranked candidate document tag has a similar or overlapping topic. By removing candidate document tags having overlapping topics, the text summary system can reduce the number of candidate document tags and leave only distinct candidate document tags.

To illustrate, in one or more embodiments, the text summary system can convert each of the candidate document tags into a set of tokens (e.g., a set of words). In some instances, the text summary system utilizes a word tokenizer model to tokenize the candidate document tags. In addition, as part of creating the token sets, the text summary system can remove special characters and punctuation as well as split compound words into multiple words or tokens.

In addition, the text summary system can utilize the token sets corresponding to the candidate document tags to determine non-distinct topics between the candidate document tags. For example, in some embodiments, the text summary system compares each of the token sets to each other to determine whether an overlap exists between the two sets of tokens. If the text summary system determines at least a threshold amount of token overlap (e.g., 30%, 50%, or 75% overlap), the text summary system can filter out the corresponding candidate document tag having a lower rank. To illustrate, in one or more embodiments, the text summary system can determine a union between two sets of tokens. If one or more tokens (e.g., words) that occur in both token sets have a length longer than half of the length of the shorter length token set (and/or the longer length token set), then the text summary system can remove the lower-ranked candidate document tag.

In additional embodiments, upon filtering out candidate document tags that overlap with higher ranked candidate document tags, the text summary system can select a number of candidate document tags to display within the interactive interface. To illustrate, FIG. 2 shows the series of acts 200 including an act 208 of the text summary system selecting candidate document tags to display within the interactive graphical user interface. For example, in one or more embodiments, the text summary system can select the top n ranked candidate document tags (e.g., the top three, five, or ten document tags) to display within the interactive interface.

FIG. 3 illustrates an interactive graphical user interface that includes document tags generated for a digital document in accordance with one or more embodiments. As shown, FIG. 3 includes a client device 300 displaying the interactive graphical user interface 302 (or simply "interactive interface 302"). The interactive interface 302 includes a document content portion 304, a document tag portion 306, and a structured text summaries portion 308.

As illustrated, the document content portion 304 includes document content 312 of a digital document 310. In various embodiments, document content 312 can include natural document segment breaks (e.g., line, sentence, paragraph, column, page, slide, sheet, layer, or section breaks). In some embodiments, the document content 312 can include graphics (e.g., images, videos, audio or clips) in addition to text.

As also illustrated, the document tag portion 306 can include the document tags 314 generated by the text summary system, as described above. For example, as shown, the text summary system displays the top five ranked document tags, which can represent the five most relevant and diverse document tags generated by the text summary system for the digital document 310. In some embodiments, the text summary system can enable the user to request additional document tags (e.g., add the next highest ranked candidate document tags). For instance, the interactive interface includes a selectable element or option for the user to request one or more additional document tags generated by the text summary system. In alternative embodiments, the user can set a preference indicating the number of document tags to be generated and displayed by the text summary system.

As described above, the text summary system can facilitate user interaction to add or remove document tags 314. For example, the text summary system can provide a cancel option (e.g., the "x") in connection with each document tag 314. In response to a user selection of a cancel option, the text summary system can remove the associated document tag from the document tag portion 306 of the interactive interface 302. As another example, the text summary system can provide a document tag input element 316 (e.g., a text box) within the interactive interface 302. In response, to a user manually input one or more document tags via document tag input element 316, the text summary system can add the user provided document tags to the document tag portion 306. In additional embodiments, the interactive interface 302 enables a user to edit a document tag. For instance, the text summary system can add, remove, or change words within a document tag based on user input.

In addition, the text summary system can detect selection of an automatically generated document tag, a user modified document tag, or a document tag created via user input (e.g., via the document tag input element 316). Upon detecting selection of one of the document tags 314, the text summary system can change the appearance of the document tag (e.g., bold the document tag button) to indicate that the document tag has been selected. The text summary system can also emphasize the corresponding document segments within the document content portion 304 of the interactive interface 302, as described below.

As part of emphasizing document content within a digital document that corresponds to a selected document tag, the text summary system can first determine correspondences between the document tags and segments of the digital document. To illustrate, FIG. 4 shows a flow diagram of a series of acts 400 for determining document segments in the digital document that correspond to a selected document tag in accordance with one or more embodiments.

Figure 4:
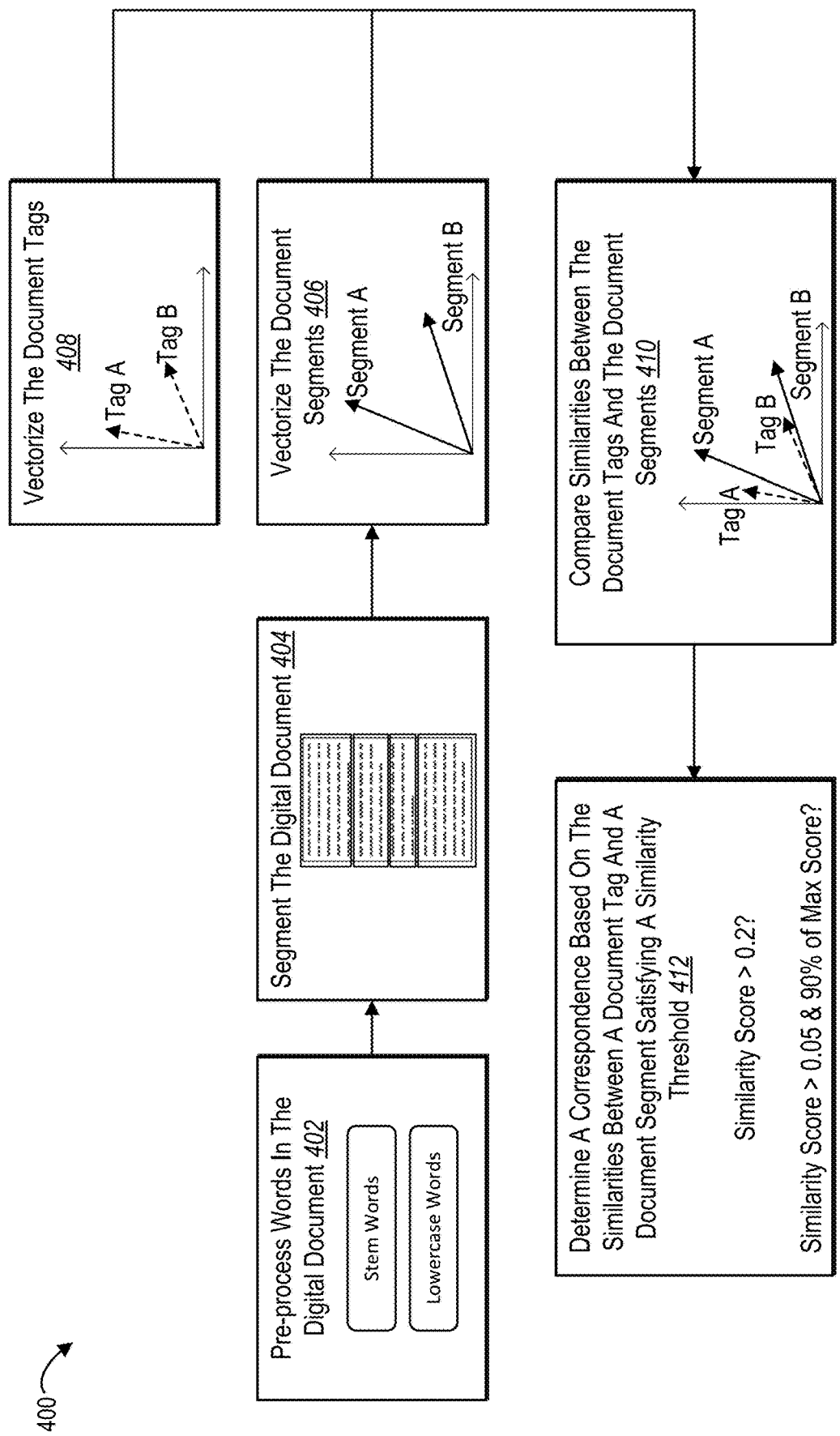
FIG. 4 illustrates a flow diagram of determining document segments in the digital document that correspond to a document tag in accordance with one or more embodiments.

As shown in FIG. 4, the series of acts 400 includes an act 402 of the text summary system (i.e., structured text summary system) pre-processing words in the digital document. For instance, the text summary system can clean, standardize, and/or normalize each of the words in the digital document. To illustrate, in one or more embodiments, the text summary system can remove linguistic morphological information from each word. For example, the text summary system can stem (or lemmatize) words to convert words to their base or root form. In some embodiments, the text summary system utilizes a word stemming model (i.e., algorithm) to convert words to their root form.

In additional embodiments, the text summary system can also pre-process words by standardizing the letter-case of words within the digital document. For example, the text summary system can convert each of the words to the same letter-case (e.g., all lower-case or to all capital letters). Further, the text summary system can perform additional pre-processing steps, such as removing stopwords from the digital document.

As shown in FIG. 4, the series of acts 400 includes an act 404 of the text summary system segmenting the digital document. For example, the text summary system can identify, split, and/or divide the digital document into sentences, paragraphs, lines, or sections. For example, the text summary system analyzes metadata of the digital document to identify paragraph marks to locate paragraph breaks in the digital document. Additionally, or in the alternative, the text summary system can identify punctuation (e.g., periods, question marks, exclamation marks) that indicate the end of sentences.

Upon segmenting the digital document, the text summary system can determine whether a document segment corresponds to one or more document tags (e.g., topics within the digital document). For example, the text summary system can compare document tags to document segments to determine whether a given document tag corresponds to one or more document segments.

In one or more embodiments, the text summary system utilizes vector representations to compare document tags to document segments. To illustrate, as shown in FIG. 4, the series of acts 400 includes an act 406 of the text summary system vectorizing the document segments. For example, the text summary system can map each document segment as a vector in vector space.

Further, as shown, the series of acts 400 includes an act 408 of the text summary system vectorizing the document tags. Indeed, the text summary system can map the document tags to the same vector space as the document segments. In this manner, the text summary system can perform comparisons in the vector space to determine correspondences between document tags and document segments, as further described below.

In various embodiments, the text summary system utilizes a word vectorization model to map document tags and document segments to the vector space. For example, the text summary system utilizes a word vectorization model (e.g., a text vectorization model) to generate vectors based on a term frequency, inverse document frequency vectorizer (TF-IDF). In some embodiments, the size of a generated vector is based on the number of words being vectorized. For instance, the vector includes an entry for each word in a document tag or document segment. In alternative embodiments, the text summary system can use an alternative word vectorization model such as, for example, occurrence, word co-occurrence matrix, word2vec, or GloVe.

To illustrate, in example embodiments, the text summary system creates a vector based on the frequency (e.g., count) that a target word appears in a document segment (e.g., a paragraph) versus the number of document segments that include the target word. Indeed, the text summary system can determine a weight based on how often a target word occurs in a first document segment versus how often the target word appears in other document segments to determine if the target word is of particular importance to the first document segment or if the target word is common across the digital document. The text summary system can determine a higher weight for words in a document segment that have high term frequencies in the document segment and a low inverse document frequency elsewhere in the digital document (e.g., within other document segments).

Upon vectorizing the document tags and the document segments utilizing the same word vectorization model or process, the text summary system can compare the vectorized representations of the document tags and the document segments to determine correspondences. To illustrate, the series of acts 400 includes an act 410 of the text summary system comparing similarities between the document tags and the document segments. As mentioned above, the text summary system can compare document tag vectors to document segment vectors in the same vector space.

More particularly, in one or more embodiments, the text summary system compares document tag vectors to document segment vectors utilizing cosine similarity comparisons. For example, the text summary system measures the distance between each document tag vector and each document segment vector in the vector space to determine a similarity score between each document tag vector and each document segment vector. In some embodiments, the text summary system can identify a max similarity score as the smallest cosine similarity measurement between a document tag vector and a document segment vector.

After determining similarity scores between each document tag and document segment, the text summary system can determine whether to assign a correspondence between a document tag and one or more document segments. To illustrate, the series of acts 400 includes an act 412 of the text summary system determining a correspondence based on the similarities between a document tag and a document segment satisfying a similarity threshold. For example, in one or more embodiments, the text summary system determines whether the similarity score satisfies a fixed similarity score threshold. For example, if the similarity score between a first document tag and one or more document segments is above 20% (i.e., 0.2) or another similarity score threshold value (e.g., 10%, 25%, 50%), the text summary system can determine or assign a correspondence between the first document tag and the one or more document segments.

In additional or alternative embodiments, the text summary system determines a correspondence between a document tag and one or more document segments based on a relative similarity score threshold. For example, the text summary system can determine whether the similarity score is within a threshold percentage value of the max similarity score, which is mentioned above. To illustrate, the text summary system can determine that the similarity score between a first document tag and a first document segment satisfies the relative similarity score threshold if the similarity score is within 90% (or another value such as 50%, 75%, 80%, 95%) of the max similarity score.

In additional embodiments, when utilizing the relative similarity score threshold, the text summary system can further determine whether the similarity score between the first document tag and the first document segment is above a minimum similarity score threshold. For example, even if the similarity score is within the threshold percentage value of the max similarity score, if the similarity score is below the minimum similarity score threshold (e.g., below 5% or another value such as 3%, 10%, 15%), then the text summary system does not assign a correspondence between the first document tag and a first document segment. In this manner, the text summary system can avoid assigning a correspondence between a document tag and a document segment when the similarity between the two is too weak.

Figure 5:
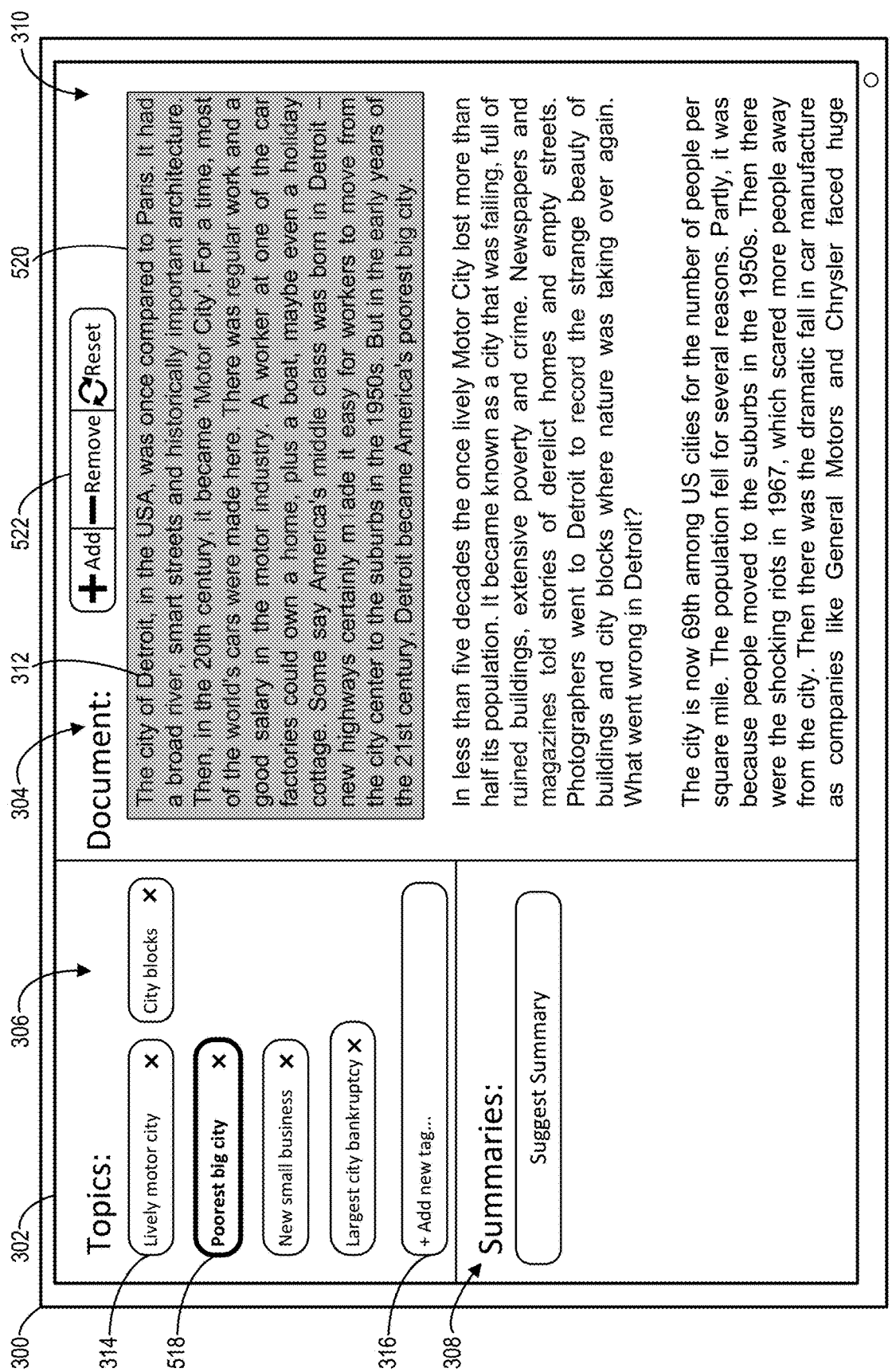
FIG. 5 illustrates an interactive graphical user interface that includes a document segment of the digital document that corresponds to a selected document tag in accordance with one or more embodiments.

As mentioned above, the text summary system can provide a visual representation of a correspondence between a document tag and one or more document segments. To illustrate, FIG. 5 shows the interactive interface 302 updated to include a document segment of the digital document that corresponds to a selected document tag in accordance with one or more embodiments. In various instances, the interactive interface 302 represents the interactive interface 302 shown on the client device 300 introduced above in connection with FIG. 3.

As illustrated, the interactive interface 302 includes the document content portion 304, which includes the document content 312 of the digital document 310. As mentioned above, the text summary system can separate the digital document 310 into document segments. For example, the text summary system can segment each sentence or each paragraph of the digital document 310 into a document segment. For simplicity, the text summary system segments the digital document 310 shown in FIG. 5 based on paragraphs. Accordingly, the document content portion 304 shows three document segments (e.g., three paragraphs).

As described above, the interactive interface 302 also includes the document tag portion 306, which displays document tags 314 generated by the text summary system and/or provided via user input (e.g., via the document tag input element 316). As shown in FIG. 5, the interactive interface 302 shows the second document tag 518 being selected (e.g., indicated in bold). For example, in response to detecting a user interaction with respect to the second document tag 518, the interactive interface 302 changes the appearance to indicate a selection of the second document tag 518.

Additionally, based on detecting a selection of the second document tag 518, the interactive interface 302 can update the document content portion 304 to select one or more document segments that share a correspondence with the selected document tag. To illustrate, the document content portion 304 shows the text summary system emphasizing the first document segment 520. For example, the text summary system highlights the first document segment 520. In alternative embodiments, the text summary system can otherwise emphasize document segments that correspond to a selected document tag. For example, the text summary system bolds, colors, surrounds, underlines, italicizes, annotates, or enlarges a document segment that corresponds to a selected document tag. In some embodiments, the text summary system adds a graphic over, near, or adjacent to a document segment that corresponds to a selected document tag to add emphasis.

While a single document segment is shown as corresponding to the selected document tag (i.e., the second document tag 518), in various embodiments, the text summary system can emphasize each document segment that is assigned a correspondence with the selected document tag, as described above. For example, if document segments correspond to sentences within the digital document 310, upon detecting selection of the second document tag 518, the text summary system can emphasize (e.g., highlight) each of the sentences that have a correspondence with the second document tag 518.

In additional embodiments, the text summary system enables multiple document tags to be selected at the same time. For example, for each selected document tag, the text summary system utilizes a different emphasis indicator. For example, the first selected document tag and corresponding document segments are highlighted with a first color when a second selected document tag and corresponding document segments are highlighted with a second color. In some embodiments, the text summary system allows for the interactive interface 302 to include multiple tabs corresponding to multiple digital documents.

As mentioned above, the text summary system can facilitate and utilize user interaction via the interactive interface 302 with respect to document segments having a correspondence to a selected document tag. For example, the interactive interface can include tools 522 for adding, removing, or resetting correspondences between the document content 312 and a selected tag. For instance, when the second document tag 518 is selected, the text summary system can receive user input via the interactive interface 302 that instructs the text summary system to add a correspondence between a word, phrase, sentence, or paragraph in the digital document 310 and the second document tag 518. Similarly, the text summary system can receive user input indicating instructions to remove a correspondence between a word, phrase, sentence, or paragraph in the digital document 310 and the second document tag 518. In this manner, the text summary system can collaborate with a user via the interactive interface to improve and refine the correspondences between document tags 314 and document content 312 within the digital document 310.

In some embodiments, the text summary system can utilize the user feedback of adding or removing correspondences to a document tag to determine better similarity scores. For example, the text summary system trains a machine-learning model to determine improved similarity scores between document tags and document segments based on the feedback provided by a user. Accordingly, by collaborating with a user via the interactive interface 302, the text summary system can continually improve in accuracy and efficiency with respect to determining correspondences between document tags and document content located within document segments.

As mentioned previously, the text summary system can generate structured text summaries based on document segments within the digital document. In particular, the text summary system can generate structured text summaries from document segments having correspondences with document tags. To illustrate, FIG. 6 shows a flow diagram of a series of acts 600 for generating a structured text summary of a document segment in the digital document in accordance with one or more embodiments.

Figure 6:
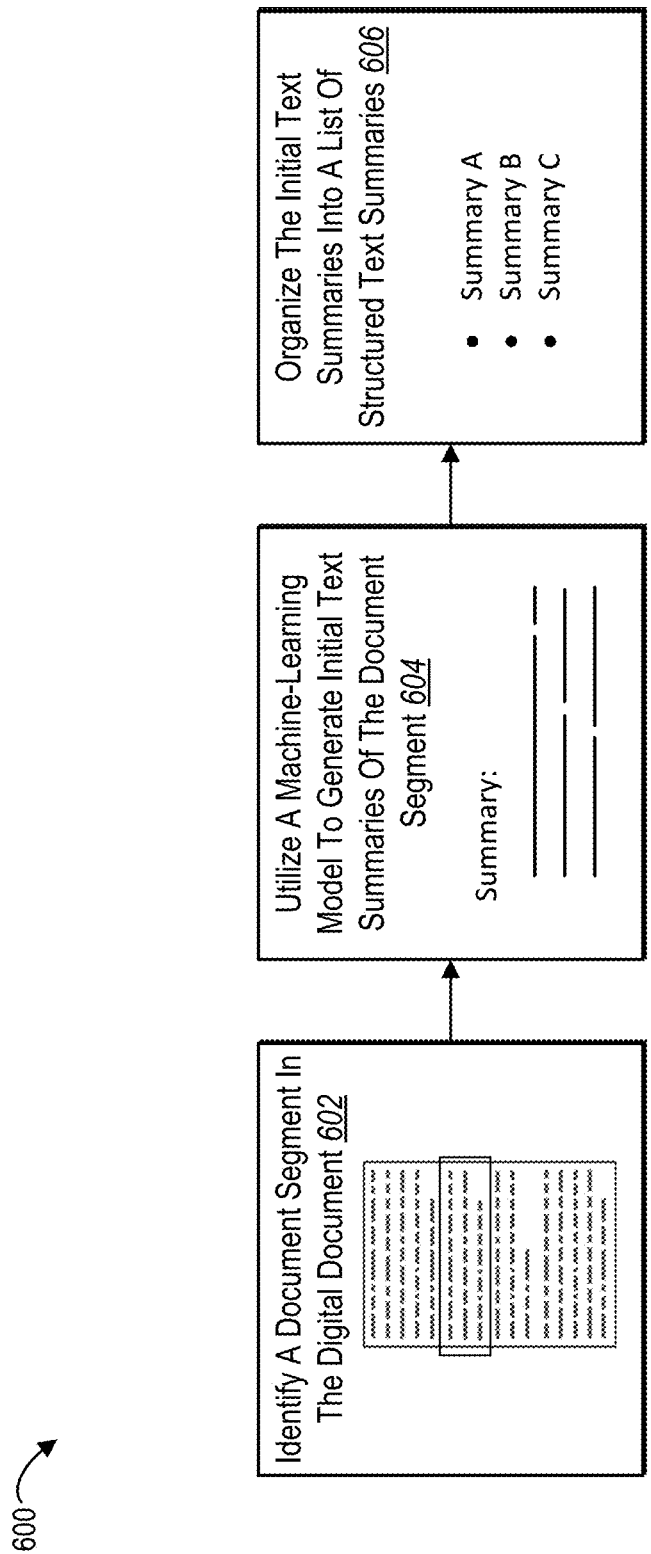
FIG. 6 illustrates a flow diagram of generating a structured text summary of a document segment in the digital document in accordance with one or more embodiments.

As shown in FIG. 6, the series of act 600 includes an act 602 of the text summary system identifying a document segment in the digital document. For example, upon detecting selection of a document tag, the text summary system can look up one or more corresponding document segments in a lookup table or identify the document segments from metadata tags associated with the document tag. In some embodiments, the text summary system can identify the document segment based on a correspondence with at least one document tag.

In addition, the series of acts 600 includes an act 604 of the text summary system utilizing a machine-learning model to generate initial text summaries for the document segment. For example, in one or more embodiments, the text summary system utilizes a structured text summaries machine-learning model to generate an abstractive summarization of the document segment. In some embodiments, the structured text summaries are not constrained to the same words or phrasing as used in the document segment.

More particularly, in various embodiments, the text summary system utilizes a sequence-to-sequence machine-learning model (e.g., a structured text summaries machine-learning model) to generate a string of text that initially summarizes the identified document segment. In some embodiments, the text summary system adds a transformer layer or architecture to the sequence-to-sequence machine-learning model when generating the initial text summaries. For example, the text summary system can employ a transformer as described in Vaswani et al., Attention is all you need, In Advances in Neural Information Processing Systems, 20187, pages 6000-6010, which is incorporated by reference herein in its entirety. Additionally, the text summary system utilizes a neural transformer-based sequence-to-sequence model with copy-attention trained on a corpus of document segments, where the model first encodes the document segment, then generates initial text summaries word-by-word using the transformer architecture. Furthermore, the text summary system can employ a copy-attention mechanism as described in See et al., Get to the point: Summarization with pointer-generator networks, April 2017, arXiv preprint arXiv:1704.04368, which is incorporated by reference herein in its entirety.

In some embodiments, the text summary system can utilize one or more of the techniques and approaches described by Gehrmann et al., Generating Abstractive Summaries with Finetuned Language Models, In INLG 2019 (GenChal Track), which is incorporated by reference herein in its entirety. In alternative embodiments, the text summary system can utilize one or more of the techniques and approaches described by Gehrmann et al., Bottom-Up Abstractive Summarization, In Proceedings of the 2018 Conference on Empirical Methods in Natural Language Processing, pages 4098-4109, 2018, which is incorporated by reference herein in its entirety. In alternative embodiments, the text summary system utilizes other machine-learning models to generate initial text summaries from the document segment. For example, the text summary system utilizes a long-short-term memory neural network or another natural language processing model to generate initial text summaries from the document segment.

As shown, the series of acts 600 includes an act 606 of the text summary system organizing the initial text summaries into a list of structured text summaries. For example, in various embodiments, the text summary system transforms the string of text, including the initial text summaries, into multiple shorter strings of text. For instance, the text summary system can split or divide the initial text summaries into a bullet point or other type of list.

In one or more embodiments, the text summary system utilizes a sentence tokenizer model to split the initial text summaries into individually structured text summaries. For example, the sentence tokenizer model identifies the end of sentences within the string of initial text summaries based on detecting a period, question mark, exclamation mark, or other character indicating the end of a sentence. In addition, the sentence tokenizer model can determine instances when a character does not indicate the end of a sentence, such as a period in an abbreviation (e.g., Dr. or U.S.). Then, as described above, the text summary system can split or separate each sentence within the initial text summaries into an individual initial text summary.

As mentioned above, the text summary system can display the structured text summaries within the interactive graphical user interface to a user. To illustrate, FIG. 7 shows the interactive interface 302 updated to display structured text summaries generated based on a document segment and a selected document tag in accordance with one or more embodiments. In various instances, the interactive interface 302 represents the interactive interface 302 shown on the client device 300 introduced above in connection with FIG. 3.

As illustrated, the interactive interface 302 includes the document content portion 304 having the document content 312 and the document tag portion 306 having the document tags 314, which are previously described. In addition, the interactive interface 302 includes the structured text summaries portion 308 having structured text summaries 724. As shown, the structured text summaries 724 correspond to the emphasized first document segment 520. Indeed, the text summary system can generate the structured text summaries 724 from the document content (e.g., text) found in the first document segment 520, as previously described.

As described above, the first document segment 520 corresponds to the selected second document tag 518. Indeed, in various embodiments, the interactive interface 302 displays text summaries that are structured based on their correspondence to both a document segment as well as a document tag. In this manner, the text summary system provides text summaries structured to topics (e.g., document tags) that are of most interest (e.g., tailored) to a user without summarizing content within the digital document 310 as a whole or summarizing portions of the digital document 310 that are less meaningful or significant to the user.

In various embodiments, the interactive interface 302 includes a summary request element 726. To illustrate, the structured text summaries portion 308 includes the summary request element 726. Upon detecting a user interaction with the summary request element 726, the text summary system can generate (and display) structured text summaries from one or more document segments, such as a document segment emphasized by the text summary system corresponding to a selected document tag. In some embodiments, a user can select the summary request element 726 to cause the text summary system to regenerate structured text summaries. For example, if the user edits a adds a document segments to a selected document tag, the user can select the summary request element 726 to cause the text summary system to generate updated structured text summaries for the selected document tag and corresponding document segments (including the newly added document segment).

In one or more embodiments, the text summary system can automatically generate structured text summaries for each document tag and the corresponding document segments. Then, upon detecting user selection of any of the document tags 314, the text summary system can update the interactive interface 302 to display the corresponding document segment(s) as well as the corresponding structured text summaries.

In alternative embodiments, the text summary system generates the structured text summaries in response to detecting a user selecting the summary request element 726 (or otherwise requesting the text summary system generate structured text summaries). For example, the text summary system holds off from processing each of the structured text summaries and only generates structured text summaries for document tags that the user requests. In some embodiments, the text summary system can verify that the user is satisfied with the document tags and/or corresponding document segments before generating the structured text summaries for the digital document 310. Indeed, the text summary system can provide multiple options and avenues to reduce computational waste with respect to generating structured text summaries, which often can be a computationally costly process.

As described above, the text summary system collaborates with the user to refine, update, and/or modify the structured text summaries. For example, the interactive interface 302 includes elements to remove one or more of the structured text summaries 724 (e.g., by detection selection of the "x" to the right of each text summary). Similarly, the interactive interface 302 can include one or more elements to add additional structured text summaries. For example, upon detecting selection of the "+" sign at the bottom of the structured text summaries 724, the text summary system prompts the user to add a structured text summary. Alternatively, the structured text summaries portion 308 can include a text summary input element (similar to the document tag input element 316).

Additionally, the text summary system collaborates with users to modify structured text summaries. For example, upon a user selecting a structured text summary, the text summary system presents the structured text summary in a text box where the user can modify the structured text summary. Further, the text summary system provides tools for users to rearrange the order of the structured text summaries or otherwise modify the structured text summaries. For instance, the text summary system can transform the structured text summaries into a multi-level hierarchal list based on user input.

Overall, the text summary system assists and collaborates with a user to create structured text summaries of digital documents that are tailored to the user. Indeed, the text summary system provides an interactive graphical user interface and various levels of intelligence that can provide suggestions at each of the three stages of the structured text summary process (e.g., document tag generation, document segment correspondence determination, and structured text summaries generation). As described above, the text summary system can propose, automatically-compete, or even fully generate document tags, corresponding document segments, and/or structured text summaries for a digital document while also allowing a user to take over at any time.

Moreover, in various embodiments, the text summary system can utilize the user modifications as feedback to train and update machine-learning models utilized to generate the structured text summaries. For example, the text summary system can utilize user modifications to the structured text summaries as a ground truth to further train the machine-learning model that generates the initial text summaries from document segments. Accordingly, by collaborating with a user via the interactive interface 302, the text summary system can continually improve in accuracy and efficiency with respect to generating the structured text summaries 724.

As described previously, the text summary system can enable a user to share or export structured text summaries along with corresponding document tags and/or corresponding document segments. By adding structured text summaries to a digital document, the digital document becomes easier to navigate and comprehend. In addition, a user that collaborates with the text summary system to generate structured text summaries for topics that are of most interest to the user can quickly communicate their interpretation of the digital document with other users in a clear and credible manner.

Figure 8:
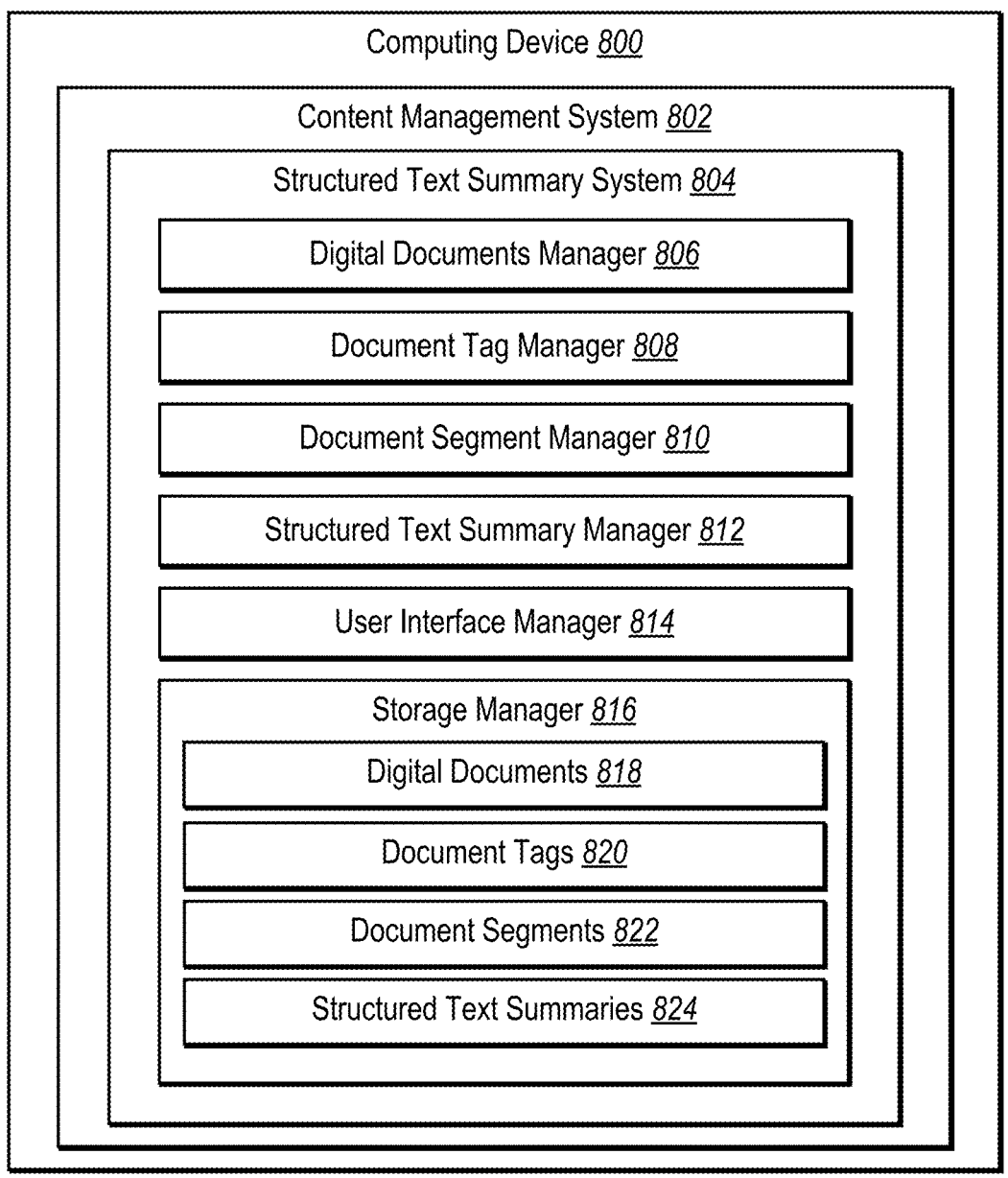
FIG. 8 illustrates a schematic diagram of an example architecture of a structured text summary system in accordance with one or more embodiments.

Referring now to FIG. 8, additional detail is provided regarding the capabilities and components of a structured text summary system 804 in accordance with one or more embodiments. In particular, FIG. 8 shows a schematic diagram of an example architecture of the structured text summary system 804 implemented within a content management system 802 and hosted on a computing device 800. The structured text summary system 804 can represent one or more of the structured text summary systems previously described.

In addition, the computing device 800 may represent various types of computing devices. For example, in some embodiments, the computing device 800 is a mobile computing device, such as a laptop, a tablet, a mobile telephone, a smartphone, etc. In one or more embodiments, the computing device 800 is a non-mobile computing device, such as a server, a cluster of servers, a desktop, or another type of non-mobile computing device. Additional details with regard to the computing device 800 are discussed below with respect to FIG. 11.

As shown, the computing device 800 includes the content management system 802. The content management system 802, in various embodiments, can identify, receive, access, open, load, edit, modify, move, copy, share, save, remove, delete, store, download, transmit, and/or import digital content (e.g., text or graphics). For example, the content management system 802 can manage digital documents that include digital content. In some embodiments, the content management system 802 is part of hardware or software native to a client device. In alternative embodiments, the content management system 802 is implemented via one or more server devices. Moreover, the content management system 802 can manage digital data (e.g., digital documents or files) for a plurality of users.

As illustrated in FIG. 8, the structured text summary system 804 includes various components for performing the processes and features described herein. For example, the structured text summary system 804 includes a digital document manager 806, a document tag manager 808, a document segment manager 810, a structured text summary manager 812, a user interface manager 814, and a storage manager 816. As shown, the storage manager 816 includes digital documents 818, document tags 820, document segments 822, and structured text summaries 824.

As mentioned above, the structured text summary system 804 includes the digital document manager 806. In various embodiments, the digital document manager 806 facilitates the retrieval, identification, access, modification, removal, deletion, transmission, and/or storage of digital documents 818. In some embodiments, the digital document manager 806 operates in connection with the content management system 802 to access digital documents 818. For example, the digital document manager 806 stores and retrieves digital documents 818 from the storage manager 816.

In one or more embodiments, the digital document manager 806 can process a digital document. For example, the digital document manager 806 can identify one or more document segments 822 within a digital document, as described above. In some embodiments, the digital document manager 806 can pre-process words within a digital document (e.g., stem and convert to lower-case), as described above.

As shown, the structured text summary system 804 includes the document tag manager 808. In various embodiments, the document tag manager 808 generates, modifies, removes, edits, creates, hides, reveals, and/or organizes document tags 820. For example, in one or more embodiments, the document tag manager 808 generates document tags 820 from a digital document, as described above. In addition, the document tag manager 808 can facilitate collaboration with a user to modify, edit, add, or remove document tags 820 from the interactive graphical user interface, as described above.

As shown, the structured text summary system 804 includes the document segment manager 810. In one or more embodiments, the document segment manager 810 generates, modifies, removes, edits, creates, and/or organizes document segments 822. For example, in various embodiments, the document segment manager 810 generates document segments 822 from document tags 820, as described above. In addition, the document segment manager 810 can facilitate collaboration with a user to modify, edit, add, or remove document segments 822 from the interactive graphical user interface, as described above.

As shown, the structured text summary system 804 includes the structured text summary manager 812. In one or more embodiments, the structured text summary manager 812 generates, modifies, removes, edits, creates, and/or organizes structured text summaries 824. For example, in various embodiments, the structured text summary manager 812 generates structured text summaries 824 from document tags 820 and/or document segments 822, as described above. In addition, the structured text summary manager 812 can facilitate collaboration with a user to modify, edit, add, or remove structured text summaries 824 from the interactive graphical user interface, as described above.

As shown, the structured text summary system 804 includes the user interface manager 814. In one or more embodiments, the user interface manager 814 provides, manages, and/or controls an interactive graphical user interface (or simply "interactive interface") and facilitates user collaboration with the structured text summary system 804, as described above. The interactive interface may be composed of one or more graphical components, objects, and/or elements that allow a user to collaborate and/or interact with the structured text summary system 804 to generate structured text summaries 824. In addition, the user interface manager 814 can provide a variety of user interfaces specific to a variety of functions, programs, applications, plug-ins, devices, operating systems, and/or components of a client device. Further, the user interface manager 814 can detect user interactions by a user with respect to the interactive interface and/or other graphical user interfaces.

As shown, the structured text summary system 804 includes the storage manager 816. As mentioned, the storage manager 816 includes the digital documents 818, the document tags 820, the document segments 822, and the structured text summaries 824, each of which is described above.

Each of the components 806-824 of the structured text summary system 804 can include software, hardware, or both. For example, the components 806-824 can include one or more instructions stored on a computer-readable storage medium and executable by processors of one or more computing devices, such as a client device (e.g., a mobile client device) or server device. When executed by the one or more processors, the computer-executable instructions of the structured text summary system 804 can cause a computing device to perform the feature learning methods described herein. Alternatively, the components 806-824 can include hardware, such as a special-purpose processing device to perform a certain function or group of functions. In addition, the components 806-824 of the structured text summary system 804 can include a combination of computer-executable instructions and hardware.

Furthermore, the components 806-824 of the structured text summary system 804 may be implemented as one or more operating systems, as one or more stand-alone applications, as one or more modules of an application, as one or more plug-ins, as one or more library functions or functions that may be called by other applications, and/or as a cloud-computing model. Thus, the components 806-824 may be implemented as a stand-alone application, such as a desktop or mobile application. Additionally, the components 806-824 may be implemented as one or more web-based applications hosted on a remote server. The components 806-824 may also be implemented in a suite of mobile device applications or "apps." To illustrate, the components 806-824 may be implemented in an application, including but not limited to ADOBE DOCUMENT CLOUD or other digital content applications software packages. The foregoing are either registered trademarks or trademarks of Adobe Inc. in the United States and/or other countries.

Figure 9:
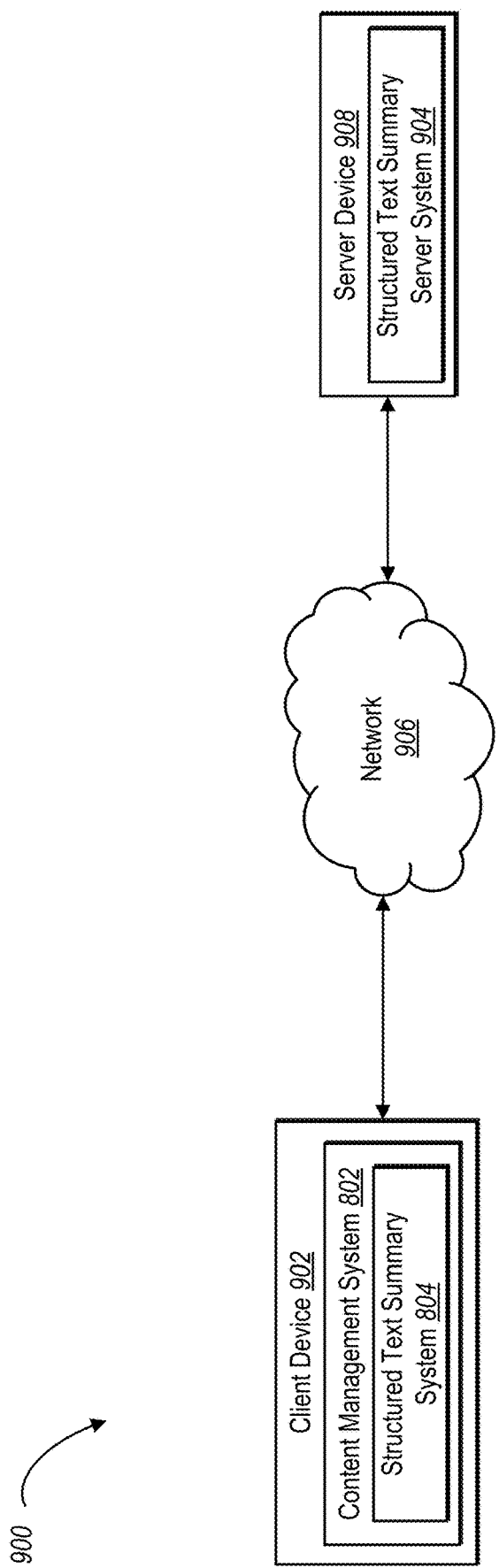
FIG. 9 illustrates a schematic diagram of an environment in which a structured text summary system can operate in accordance with one or more embodiments.

FIG. 9 illustrates a schematic diagram of a system environment 900 in which the structured text summary system 804 can operate in accordance with one or more embodiments. As shown in FIG. 9, the environment 900 includes a client device 902 and a server device 908 connected via a network 906. Additional detail regarding computing devices (e.g., the client device 902 and the server device 908) is provided below in connection with FIG. 11. Further, FIG. 11 also provides detail regarding networks, such as the illustrated network 906.

Although FIG. 9 illustrates a particular number, type, and arrangement of components within the environment 900, various additional environment configurations are possible. For example, the server device 908 can represent a set of connected server devices. As another example, the environment 900 can include an additional number of client devices. As a further example, the client device 902 may communicate directly with the server device 908, bypassing the network 906 or utilizing a separate and/or additional network.

As shown, the client device 902 includes the structured text summary system 804 implemented within the content management system 802, which is described above. In one or more embodiments, the structured text summary system 804 operates on a client device without the content management system 802. For example, the structured text summary system 804 is a stand-alone application that operates on the client device 902.

As shown, the environment 900 includes the server device 908 implementing a text summary server system 904. In one or more embodiments, the text summary server system 904 communicates with the structured text summary system 804 on the client device 902 to facilitate the functions, operations, and actions previously described above with respect to the structured text summary system 804. For example, the text summary server system 904 can provide digital content (e.g., a web page) to a user on the client device 902 and facilitate generating structured text summaries within a digital document via an interactive graphical user interface.

Moreover, in one or more embodiments, the text summary server system 904 on the server device 908 can include all, or a portion of, the structured text summary system 804. For example, the structured text summary system described herein is located on the server device 908 as the text summary server system 904, which is accessed by a user via an application on the client device 902. In some embodiments, the client device 902 can download all or a portion of a software application corresponding to the structured text summary system 804 such that at least a portion of the operations performed by the structured text summary system 804 occur on the client device 902.

FIGS. 1-9, the corresponding text, and the examples provide a number of different methods, systems, devices, and non-transitory computer-readable media of the structured text summary system 804. In addition to the foregoing, one or more embodiments can also be described in terms of flowcharts comprising acts for accomplishing a particular result, such as the flowcharts of acts shown in FIG. 10. Additionally, the acts described herein may be repeated or performed in parallel with one another or parallel with different instances of the same or similar acts.

Figure 10:
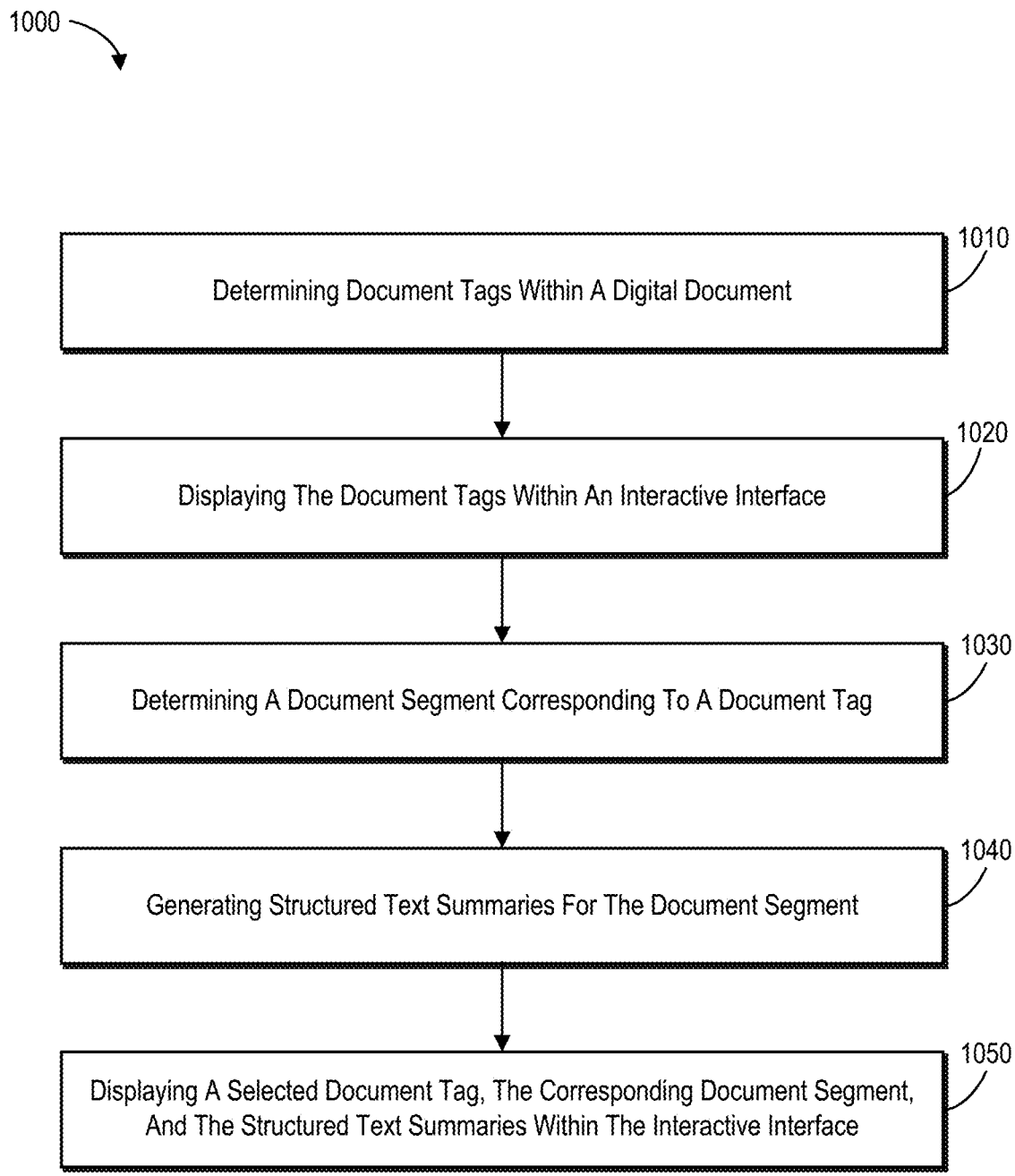
FIG. 10 illustrates a flowchart of a series of acts of collaboratively generating structured text summaries in digital documents in accordance with one or more embodiments.

As mentioned previously, FIG. 10 illustrates a flowchart of a series of acts 1000 of collaboratively generating structured text summaries in digital documents in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer-readable medium can comprise instructions that, when executed by one or more processors, cause a computing device to perform the acts of FIG. 10. In some embodiments, a system can perform the acts of FIG. 10.

In one or more embodiments, the series of acts 1000 is implemented on one or more computing devices, such as the client devices 300, 902, the server device 908, or the computing devices 800. In addition, in some embodiments, the series of acts 1000 is implemented in a digital medium environment for displaying digital documents. For example, the series of acts 1000 is implemented on a computing device having memory that includes a digital document, a text vectorization model, and a structured text summaries machine-learning model.

The series of acts 1000 can include an act 1010 of determining document tags within a digital document. In some embodiments, the act 1010 can involve determining one or more document tags within a digital document. In some embodiments, the act 1010 can include receiving user input from a client device associated with a first user that adds one or more document tags in connection with the digital document.

In one or more embodiments, the act 1010 includes determining the one or more document tags within the digital document based on a grammar matching pattern. In additional embodiments, the act 1010 can include determining the one or more document tags within the digital document by identifying candidate document tags based on the grammar matching pattern, ranking the candidate document tags, filtering out overlapping candidate document tags, and selecting a threshold number of candidate document tags as the one or more document tags. In some embodiments, the grammar matching pattern includes zero or more adjectives and one or more nouns or proper nouns.

As shown, the series of acts 1000 also includes an act 1020 of displaying the document tags within an interactive interface. In particular, the act 1020 can involve displaying one or more document tags corresponding to the digital document within an interactive graphical user interface. In one or more embodiments, the act 1020 can include displaying the digital document within an interactive graphical user interface. In some embodiments, the interactive graphical user interface includes a document tag portion displaying the selected document tag, and a structured text summary portion. In example embodiments, the act 1020 can include detecting, within an interactive graphical user interface associated with a first user, edits to a generated document tag corresponding to a digital document.

As shown in FIG. 10, the series of acts 1000 further includes an act 1030 of determining a document segment corresponding to a document tag. In particular, the act 1030 can include determining, for a document tag of the one or more document tags, a document segment of the digital document that corresponds to the document tag. In example embodiments, the act 1030 can include determining a correspondence between a document segment of a plurality of document segments and a document tag of the one or more document tags based on a text vectorization model. In some embodiments, the act 1030 can include determining a document segment in the digital document based on a user-edited document tag.

In one or more embodiments, the act 1030 can include determining one or more document segments that correspond to the document tag by determining a plurality of segments within the digital document, vectorizing each of the plurality of document segments (e.g., utilizing the text vectorization model), vectorizing the document tag (e.g., utilizing the same text vectorization model), determining similarity scores between the vectorized document tag and each of the plurality of vectorized document segments, and determining the document segment from the plurality of document segments based on the document segment having a similarity score that satisfies one or more similarity score thresholds.

In various embodiments, the act 1030 can include displaying the document segment within the digital document by emphasizing a plurality of words within the digital document that has a correspondence to the document tag. In additional embodiments, the act 1030 can include receiving user input from a client device associated with a first user that adds additional words in the digital document to the correspondence with the document tag by selecting additional words within the document segment to be emphasized in connection with the document tag or removes words in the digital document from the correspondence with the document tag by deselecting previously emphasized words in the digital document.

As shown, the series of acts 1000 also includes an act 1040 of generating structured text summaries for the document segment. In particular, the act 1040 can include generating, based on the document segment, one or more structured text summaries. In one or more embodiments, the act 1040 can include generating structured text summaries of the document segment based on the structured text summaries machine-learning model. In some embodiments, the act 1040 can include generating the one or more structured text summaries by utilizing a sequence-to-sequence transformer model (e.g., a structured text summaries machine-learning model) to generate an initial structured text summary from the document segment and tokenizing the initial structured text summary into the one or more structured text summaries.

As shown, the series of acts 1000 additionally includes an act 1050 of displaying a selected document tag, the corresponding document segment, and the structured text summaries within the interactive interface. In particular, the act 1050 can include displaying, in response to detecting selection of the document tag, the document segment and the one or more structured text summaries within the interactive graphical user interface. In some embodiments, the act 1050 can include detecting selection of the document tag within an interactive graphical user interface. In one or more embodiments, the interactive graphical user interface includes a document content portion displaying a plurality of document segments including emphasizing the document segment corresponding to the selected document tag (e.g., an emphasized version of the document segment) and a structured text summary portion displaying the one or more structured text summaries.

The series of acts 1000 can include various additional acts. For example, the series of acts 1000 can include the acts of detecting, within the interactive graphical user interface, modifications to the document segment; generating one or more structured text summaries for the modified document segment; and detecting, within the interactive graphical user interface, updates to a structured text summary of the one or more structured text summaries. In some embodiments, the series of acts 1000 includes an act of sharing the digital document with the document tag, modified document segment, and the updated structured text summaries to a client device associated with a second user.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the structured text summary system to capture generate and/or identify document tags, document segments and/or structured text summaries, as described herein.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general-purpose or special-purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special-purpose computer, or special-purpose processing device to perform a certain function or group of functions. In some embodiments, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 11:
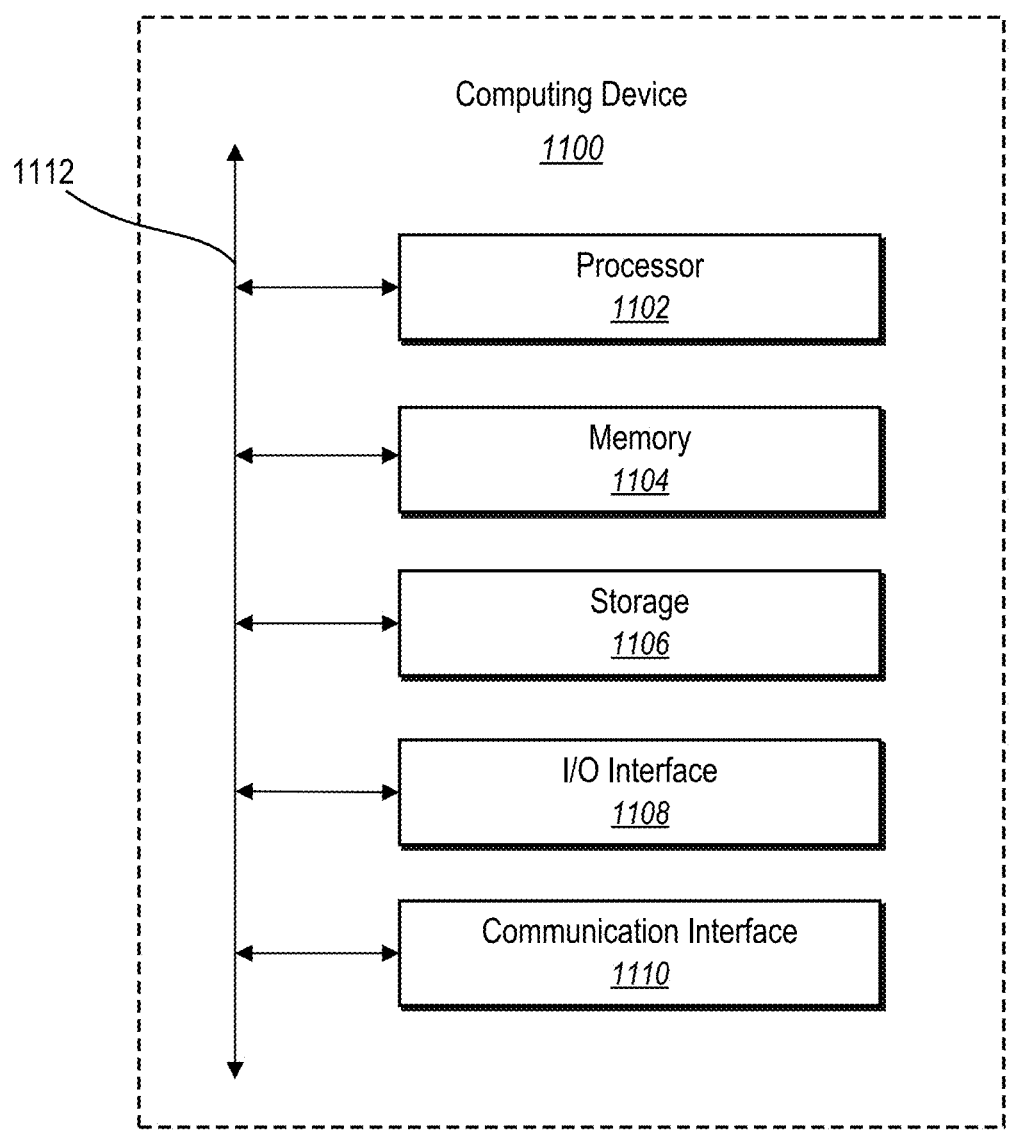
FIG. 11 illustrates a block diagram of an example computing device for implementing one or more embodiments of the present disclosure.

FIG. 11 illustrates a block diagram of an example computing device 1100 that may be configured to perform one or more of the processes described above. One will appreciate that one or more computing devices, such as the client devices 300, 902, the server device 908, or the computing devices 800. In one or more embodiments, the computing device 1100 may be a mobile device (e.g., a laptop, a tablet, a smartphone, a mobile telephone, a camera, a tracker, a watch, a wearable device, etc.). In some embodiments, the computing device 1100 may be a non-mobile device (e.g., a desktop computer, a server device, a web server, a file server, a social networking system, a program server, an application store, or a content provider). Further, the computing device 1100 may be a server device that includes cloud-based processing and storage capabilities.

As shown in FIG. 11, the computing device 1100 can include one or more processor(s) 1102, memory 1104, a storage device 1106, input/output ("I/O") interfaces 1108, and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (e.g., user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of these I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of computing device 1100 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computing device to:
    display a digital document comprising text within an interactive graphical user interface;
    based on identifying the digital document, automatically generate one or more document tags corresponding to the digital document by:
        parsing the text of the digital document to identifying a plurality of candidate document tags that comprise a subset of the text; and
        selecting a subset number of candidate document tags from the plurality of candidate document tags as the one or more document tags;
    display the one or more document tags corresponding to the digital document within the interactive graphical user interface;
    determine, for a document tag of the one or more document tags, a document segment of the digital document that corresponds to the document tag;

generate, based on the document segment, one or more structured text summaries utilizing a structured text summaries machine-learning model comprising one or more algorithms trained to automatically generate text summaries from inputted text; and display, in response to detecting a selection of the document tag, the document segment and the one or more structured text summaries within the interactive graphical user interface.

2. The non-transitory computer-readable medium of claim 1, wherein the interactive graphical user interface comprises a plurality of visually distinct portions comprising:
   a document tag portion displaying the selected document tag;
   a document content portion displaying a plurality of document segments including emphasizing the document segment corresponding to the selected document tag; and
   a structured text summary portion displaying the one or more structured text summaries.

3. The non-transitory computer-readable medium of claim 2, further comprising additional instructions that, when executed by the at least one processor, cause the computing device to automatically determine the one or more document tags within the digital document by:
   identifying the candidate document tags from the text of the digital document based on matching a parts-of-speech matching pattern, wherein the parts-of-speech matching pattern comprises zero or more adjective words followed by one or more nouns or proper noun words.

4. The non-transitory computer-readable medium of claim 3, wherein the additional instructions, when executed by the at least one processor, cause the computing device to determine the one or more document tags within the digital document by:
   ranking the candidate document tags;
   filtering out overlapping candidate document tags; and
   selecting a threshold number of candidate document tags as the one or more document tags.

5. The non-transitory computer-readable medium of claim 4, wherein the additional instructions, when executed by the at least one processor, cause the computing device to filter out overlapping candidate document tags by:
   determining a plurality of candidate document tags having overlapping topics; and
   removing one or more candidate document tags from the plurality of candidate document tags based on the ranking of the plurality of candidate document tags.

6. The non-transitory computer-readable medium of claim 2, further comprising additional instructions that, when executed by the at least one processor, cause the computing device to receive user input from a client device associated with a first user that adds one or more document tags in connection with the digital document.

7. The non-transitory computer-readable medium of claim 2, wherein the instructions, when executed by the at least one processor, cause the computing device to determine the document segments of the digital document that correspond to the document tag by:
   determining a plurality of segments within the digital document;
   vectorizing each of the plurality of document segments;
   vectorizing the document tag;
   determining similarity scores between the vectorized document tag and each of the plurality of vectorized document segments; and
   determining the document segment from the plurality of document segments based on the document segment having a similarity score that satisfies one or more similarity score thresholds.

8. The non-transitory computer-readable medium of claim 1, wherein the instructions, when executed by the at least one processor, cause the computing device to display the document segment within the digital document to emphasize a plurality of words within the digital document that has a correspondence to the document tag by automatically modifying a visual appearance of the plurality of words while the document tag is selected.

9. The non-transitory computer-readable medium of claim 8, further comprising additional instructions that, when executed by the at least one processor, cause the computing device to receive user input from a client device associated with a first user that:
   modify the correspondence with the document tag to add additional words to the correspondence with the document tag by selecting additional words within the document segment to be emphasized in connection with the document tag; or
   modify the correspondence with the document tag to remove words from the correspondence with the document tag by deselecting previously emphasized words in the digital document.

10. The non-transitory computer-readable medium of claim 1, wherein the instructions, when executed by the at least one processor, cause the computing device to generate the one or more structured text summaries by:
    utilizing a sequence-to-sequence transformer neural network to automatically generate an initial structured text summary from the document segment; and
    tokenizing the initial structured text summary into the one or more structured text summaries utilizing a sentence tokenizer.

11. A system comprising:
    one or more non-transitory memory devices comprising:
    a digital document comprising text;
    a text vectorization model; and
    a structured text summaries machine-learning model comprising one or more algorithms trained to automatically generate text summaries from inputted text; and at least one processor configured to cause the system to:
    automatically determine one or more document tags within the digital document utilizing parts-of-speech pattern matching by:
       parsing the text of the digital document to identifying a plurality of candidate document tags that comprise a subset of the text; and
       selecting a subset number of candidate document tags from the plurality of candidate document tags as the one or more document tags;
    automatically determine a vector correspondence between a document segment of a plurality of document segments and a document tag of the one or more document tags utilizing the text vectorization model;
    automatically generate structured text summaries of the document segment based on the structured text summaries machine-learning model;
    detect, within an interactive graphical user interface, selection of the document tag; and
    provide for display, within the interactive graphical user interface, the selected document tag in connection with an emphasized version of the document segment and the generated structured text summaries.

12. The system of claim 11, wherein the parts-of-speech pattern matching comprises matching a parts-of-speech pattern of zero or more adjectives with one or more nouns or proper nouns.

13. The system of claim 11, wherein the at least one processor is further configured to cause the system to determine the one or more document tags within the digital document by:
   identifying the candidate document tags based on the parts-of-speech pattern matching; ranking the candidate document tags utilizing a topical page rank model; filtering out overlapping lower-ranked candidate document tags; and selecting a threshold number of candidate document tags as the one or more document tags.

14. The system of claim 11, wherein the at least one processor is further configured to cause the system to determine the correspondence between the document segment of the plurality of document segments and the document tag of the one or more document tags by:
   vectorizing, utilizing the text vectorization model, each of the plurality of document segments;
   vectorizing, utilizing the text vectorization model, the document tag;
   determining similarity scores between the vectorized document tag and each of the plurality of vectorized document segments; and
   determining the document segment from the plurality of document segments based on the document segment having a similarity score that satisfies one or more similarity score thresholds.

15. The system of claim 11, wherein the at least one processor is further configured to cause the system to generate the structured text summaries by:
   utilizing the structured text summaries machine-learning model to generate an initial structured text summary from the document segment; and
   tokenizing the initial structured text summary into the structured text summaries.

16. In a digital medium environment for displaying digital documents, a computer-implemented method of generated structured text summaries comprising:
   generating, within an interactive graphical user interface of a first client device associated with a first user, a user-edited document tag from edits to an automatically generated document tag corresponding to a digital document;
   based on detecting the user-edited document tag:
      analyzing document segments in the digital document to automatically determine a document segment in the digital document corresponding to the user-edited document tag; and
      automatically generating one or more structured text summaries for the document segment utilizing a structured text summaries machine-learning model comprising one or more algorithms trained to automatically generate text summaries from inputted text;
   detecting, within the interactive graphical user interface, updates to a structured text summary of the one or more structured text summaries; and
   sharing the digital document with the user-edited document tag, the document segment, and the updated structured text summaries to a second client device associated with a second user that differs from the first user.

17. The computer-implemented method of claim 16, wherein the interactive graphical user interface comprises a document tag portion, a document content portion, and a structured text summary portion.

18. The computer-implemented method of claim 17, further comprising:
   generating the one or more document tags automatically within the digital document prior to detecting edits to the generated document tag; and
   displaying the one or more document tags within the document tag portion of the interactive graphical user interface.

19. The computer-implemented method of claim 16, wherein determining the document segment within the digital document comprises:
   determining a plurality of segments within the digital document;
   vectorizing each of the plurality of document segments;
   vectorizing the user-edited document tag;
   determining similarity scores between the vectorized user-edited document tag and each of the plurality of vectorized document segments; and
   determining the document segment from the plurality of document segments based on the document segment having a similarity score that satisfies one or more similarity score thresholds.

20. The computer-implemented method of claim 16, wherein generating the one or more structured text summaries for the document segment comprises:
   utilizing a sequence-to-sequence transformer neural network to generate an initial structured text summary from the document segment; and
   tokenizing the initial structured text summary into the one or more structured text summaries utilizing a sentence tokenizer.

* * * * *